US012642269B2

(12) United States Patent
Brown et al.

(10) Patent No.: US 12,642,269 B2
(45) Date of Patent: *Jun. 2, 2026

(54) HYDROGELS AS CARRIERS OF ACTIVE INGREDIENTS AND METHODS OF PRODUCING THE SAME

(71) Applicant: WinField Solutions, LLC, Arden Hills, MN (US)

(72) Inventors: Danny Brown, Woodbury, MN (US); Christine Colby, Lino Lakes, MN (US); Lillian Magidow, St. Paul, MN (US); Megan Barta, River Falls, WI (US); Dustyn Sawall, River Falls, WI (US)

(73) Assignee: WinField Solutions, LLC, Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,857

(22) Filed: Mar. 19, 2024

(65) Prior Publication Data

US 2024/0306635 A1     Sep. 19, 2024

Related U.S. Application Data

(63) Continuation of application No. 16/673,941, filed on Nov. 4, 2019, now Pat. No. 11,968,976.

(60) Provisional application No. 62/758,049, filed on Nov. 9, 2018.

(51) Int. Cl.
| | |
|---|---|
| *A01N 25/04* | (2006.01) |
| *A01N 31/04* | (2006.01) |
| *A01N 43/647* | (2006.01) |
| *A01N 57/20* | (2006.01) |

(52) U.S. Cl.
CPC ............. *A01N 25/04* (2013.01); *A01N 31/04* (2013.01); *A01N 43/647* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 5,137,726 | A | 8/1992 | Ogawa et al. |
| 5,474,915 | A | 12/1995 | Dordick et al. |
| 5,572,827 | A | 11/1996 | Conrad |

(Continued)

FOREIGN PATENT DOCUMENTS

| | | |
|---|---|---|
| CN | 105102525 A | 11/2015 |
| CN | 106561682 A | 4/2017 |

(Continued)

OTHER PUBLICATIONS

Zhang, et al., "Semiconductor Nanoparticle-Based Hydrogels Prepared via Self-Initiated Polymerization Under Sunlight, Even Visible Light", Scientific Reports, vol. 3, No. 1399, 7 pages, Mar. 7, 2013.

(Continued)

*Primary Examiner* — Bethany P Barham
(74) *Attorney, Agent, or Firm* — Dorsey & Whitney LLP

(57) ABSTRACT

Active ingredient-carrying hydrogels include at least a hydrogel and an active ingredient. The active ingredient is released from the hydrogel onto an agricultural substrate or at an agricultural site in a controlled manner. The hydrogel may include lactose, which may be provided by a milk permeate waste stream from the dairy or food processing industry.

20 Claims, 5 Drawing Sheets

(56) References Cited

U.S. PATENT DOCUMENTS

| | | | |
|---|---|---|---|
| 6,197,757 | B1 | 3/2001 | Perrier et al. |
| 6,716,885 | B1 | 4/2004 | Twydell et al. |
| 10,800,893 | B2 | 10/2020 | Patel et al. |
| 11,363,813 | B2 | 6/2022 | Brown et al. |
| 2007/0128121 | A1 | 6/2007 | Densmore et al. |
| 2012/0034271 | A1 | 2/2012 | Shu |
| 2013/0165533 | A1 | 6/2013 | Liao et al. |
| 2014/0100111 | A1 | 4/2014 | Schultz et al. |
| 2014/0113821 | A1 | 4/2014 | Gu et al. |
| 2014/0259906 | A1 | 9/2014 | Shani et al. |
| 2016/0017079 | A1 | 1/2016 | Rodrigues et al. |
| 2017/0081453 | A1 | 3/2017 | Rodrigues et al. |
| 2017/0196175 | A1 | 7/2017 | Shani et al. |
| 2018/0297902 | A1 | 10/2018 | Chand |
| 2019/0202998 | A1 | 7/2019 | Yang et al. |
| 2020/0146282 | A1 | 5/2020 | Brown et al. |
| 2020/0146283 | A1 | 5/2020 | Brown et al. |
| 2020/0148836 | A1 | 5/2020 | Patel et al. |
| 2022/0279785 | A1 | 9/2022 | Brown et al. |

FOREIGN PATENT DOCUMENTS

| | | |
|---|---|---|
| CN | 107663262 A | 2/2018 |
| CN | 107663263 A | 2/2018 |
| EP | 2693893 A2 | 2/2014 |
| JP | 2006274227 A | 10/2006 |
| WO | 9636226 A1 | 11/1996 |
| WO | 2017223261 A2 | 12/2017 |
| WO | 2018030631 A1 | 2/2018 |
| WO | 2018070546 A1 | 4/2018 |

OTHER PUBLICATIONS

Zhou, et al., "Synthesis and Characterization of New Styrene Main-Chain Polymer with Pendant Lactose Moiety through Urea Linkage", Macromolecules; vol. 32, 1999, pp. 5507-5513.

Zhou, et al., "Synthesis and Characterization of Random Hydrophilic/ Hydrophobic Copolymers of Styrene and D-Lactose-O Vinylbenzylhydroxime", Journal of Polymer Science: Part A: Polymer Chemistry; vol. 36, 1998, pp. 2971-2978.

Zhou, et al., "Synthesis and Properties of a Novel Water-Soluble Lactose-Containing Polymer andits Cross-Linked Hydrogel", Macromolecules; vol. 30, 1997, pp. 7063-7068.

Zhou, "Synthesis and Thermal Properties of a Novel Lactose-Containing Poly(N-isopropylacrylamide-co-acrylamidolactamine) Hydrogel", Journal of Polymer Science: Part A: Polymer Chemistry; vol. 37, 1999, pp. 1393-1402.

Technical Examination Report issued in Brazilian Application No. BR102019023444-0, mailed on Sep. 17, 2024, 16 pages including 8 pages of machine English translation.

First Examination Report issued in Australian Patent Application No. 2019257406 on Aug. 26, 2024, 3 pages.

First Examination Report issued in Australian Patent Application No. 2019261809, mailed on Aug. 19, 2024, 8 pages.

Office Action issued in European Patent Application No. 19208200. 6, mailed on Mar. 26, 2025, 7 pages.

Examination Report issued in Brazilian Patent Application No. BR102019023444-0, mailed on Dec. 10, 2024, 12 pages including 6 pages of machine translation.

Office Action issued in Canadian Patent Application No. 3,060,806, mailed on Jan. 24, 2025, 3 page.

Examination report issued in Canadian patent application 3,060,806, mailed on Dec. 21, 2023, 5 pages.

Seaman, "Trends in the Formulation of Pesticides—An Overview" Pestic. Sci. 1990, 29, 437-449.

"Ambient Lighting", Wikipedia entry, 1 page, downloaded on Jan. 14, 2023.

"European Search Report for EP App. No. 19208203.0, mailed Feb. 11, 2020".

Ahmed, "Hydrogel: Preparation, characterization, and applications: A review", Journal of Advanced Research; vol. 6, 2015, pp. 105-121.

American Dairy Products Institute , "2013 Dairy Products Utilization and Production Trends", 2013, 5 pages.

Andriola, et al., "The effect of sterilization methods on the thermogelation", Polymer Degradation and Stability 95 (2010) 254-259.

Andrzejewska, "Photopolymerization kinetics of multifunctional monomers", Prog. Polym. Sci.; vol. 26, 2001, pp. 605-665.

Beckerman, "Tank Mixes", Purdue University Facts for Fancy Fruit, vol. 23, No. 3, 2 pages, Apr. 27, 2023.

Bhattacharyya, et al., "Appendix 2 Dissociation Constants (pka) of Common Sugars and Alcohols", 2012, pp. 455-456.

Burdick, et al., "Hyaluronic Acid Hydrogels for Biomedical Applications", Adv. Mater; vol. 23, No. 12, Mar. 25, 2011, 31 pages.

Decker, "Photoinitiated Crosslinking Polymerisation", Prog. Polym. Sci.; vol. 21, 1996, pp. 593-650.

Fan, et al., "Synthesis and Characterization of Lactose Based Resorcinol Resin", Journal of Applied Polymer Science; vol. 86, 2002, pp. 2581-2585.

Fang, "Photodissociation of Acrylic Acid in the Gas Phase: An ab Initio Study", J. Am. Chem. Soc.; vol. 122, 2000, pp. 10886-10894.

Feng, "Determination of Proton Affinities and Acidity Constants of Sugars", J. Phys. Chem.; vol. 117, 2013, pp. 5211-5219.

Guilherme, "Superabsorbent hydrogels based on polysaccharides for application in agriculture as soil conditioner and nutrient carrier: A review", European Polymer Journal; vol. 72, 2015, pp. 365-385.

Hoijemberg, et al., "Two Routes Towards Photoinitiator-Free Photopolymerization in Miniemulsion: Acrylate Self-Initiation and Photoactive Surfactant", Macromol. Chem. Phys.; vol. 212, 2011, pp. 2417-2422.

Hou, et al., "Facile Synthesis of Chain-End Functionalized Glycopolymers for Site-Specific Bioconjugation", Bioconjugate Chem.; vol. 15, 2004, pp. 954-959.

Hu, et al., "Nondestructive Quantification of Organic Compunds in Whole Mile without Pretreatment by Two-Dimensional NMR Spectroscopy", J. Agric. Food Chem.; vol. 55, 2007, pp. 4307-4311.

Huang, et al., "Lactose-Containing Hydrogels for Enzyme Stabilization", Journal of Polymer Science; vol. 54, 2016, pp. 2507-2514.

Huang, et al., "Synthesis and Anticoagulant Activity of Polyureas Containing Sulfated Carbohydrates", Biomacromolecules; vol. 15, 2014, pp. 4455-4466.

Illanes, "Lactose-Derived Prebiotics Chapter 1 Lactose: Production and Upgrading", 2016, 33 pages.

Khoushabi, et al., "Photo-polymerization, swelling and mechanical properties of cellulose fibre reinfored poly (ethylene glycol) hydrogels", Composites Science and Technology; vol. 119, 2015, pp. 93-99.

Knolle, et al., "Direct (222 nm) photopolymerisation of acrylates. A laser flash photolysis and quantum chemical study", Radiation Physics and Chemistry; vol. 67, 2003, pp. 341-345.

Kosemund, et al., "Safety evaluation of superabsorbent baby diapers", Regulatory Toxicology and Pharmacology; vol. 53, 2009, pp. 81-89.

Leach, et al., "Photocrosslinked Hyaluronic Acid Hydrogels: Natural, Biodegradable Tissue Engineering Scaffolds", Biotechnology and Bioengineering; vol. 82, No. 5, Jun. 5, 2003, pp. 578-589.

Lee, et al., "Initiatorless Photopolymerization of Liquid Crystal Monomers", ACS Appl. Mater. Interfaces; vol. 8, 2016, pp. 28040-28046.

Lee, et al., "Trehalose hydrogels for stabilization of enzymes to heat", Polym. Chem.; vol. 6, 2015, pp. 3443-3448.

Lin, et al., "Solution copolymerization of D-lactose-O-(p-vinylbenzyl)-hydroxime with acrylonitrile", Polymer; vol. 39 No. 20, 1998, pp. 4911-4914.

Mathur, et al., "Methods for Synthesis of Hydrogel Networks: A Review", J. Macromolecular Sci.; vol. 36, 1996, pp. 405-430.

Murakami , et al., "Bio-Based Hydrogels Prepared by Cross-Linking of Microbial Poly (y-glutamic acid) with Various Saccharides", Biomacromolecules, vol. 7, No. 7, pp. 2122-2127, 2006.

Ortega, et al., "Structure-Property Relationships in Photopolymerizable Polymer Networks: Effect of Composition on the Crosslinked

(56)                    References Cited

OTHER PUBLICATIONS

Structure and Resulting Thermomechanical Properties of a (Meth)acrylate-Based System", J. Appl. Polym. Sci.; vol. 110, 2008, pp. 1559-1572.

Patel, et al., "Preparation and Characterization of Freeze-dried Chitosan-Poly(Ethylene Oxide) Hydrogels for Site-Specific Antibiotic Delivery in the Stomach", Pharmaceutical Research; vol. 13, No. 4, 1996, pp. 588-593.

Patil, et al., "Macroporous poly)sucrose acrylate) hydrogel for controlled release of macromolecules", Biomaterials; vol. 17, 1996, pp. 2343-2350.

Patil, et al., "Sucrose Diacrylate: A Unique Chemically and Biologically Degradable Crosslinker for Polymeric Hydrogels", J Polym Sci A: Polym Chem; vol. 35, 1997, pp. 2221-2229.

Peppas, et al., "Hydrogels in pharmaceutical formulations", European Journal of Pharmaceutics and Biopharmaceutics; vol. 50, 2000, pp. 27-46.

Peteu, et al., "Responsive Polymers for Crop Protection", Ploymers, vol. 2, pp. 229-251, 2010.

Rudzinski , et al., "pH-sensitive acrylic-based copolymeric hydrogels for the controlled release of a pesticide and a micronutrient", Journal of Applied Polymer Science, vol. 87, No. 3, Jan. 18, 2003 (Jan. 18, 2003), pp. 394-403.

Shantha, et al., "Synthesis and Evaluation of Sucrose-Containing Polymeric Hydrogels for Oral Drug Delivery", Journal of Applied Polymer Science; vol. 84, 2002, pp. 2597-2604.

Singh, et al., "Synthesis and characterization of agar-starch based hydrogels for slow herbicide delivery applications", International Journal of Plastics Technology, Central Institute of Plastics Engineering & Technology, Cipet, IN, vol. 19, No. 2, Dec. 16, 2015 (Dec. 16, 2015), pp. 263-274.

Slaughter, et al., "Hydrogels in Regenerative Medicine", Adv Mater; vol. 21, Sep. 4, 2009, pp. 3307-3329.

Sun, et al., "Glycosaminoglycan Mimetic Biomaterials. 4. Synthesis of Sulfated Lactose-Based Glycopolymers That Exhibit Anticoagulant Activity", Biomacromolecules; vol. 3, 2002, pp. 1062-1070.

Sundekilde, et al., "Relationship between the Metabolite Profile and Technological Properties of Bovine Milk from Two Dairy Breeds Elucidated by NMR-Based Metabolomics", J. Agric. Food Chem.; vol. 59, 2011, pp. 7360-7367.

Think USA Dairy, U.S. Dairy Export Council , "Whey and Milk Permeate—Cost Saving, Flavor Enhancing Ingredient", 2015, 4 pages.

USDA, "Dairy Products 2017 Summay (Apr. 2018)", National Agricultural Statistics Service, Apr. 2018, 58 pages.

Van Den Bulcke, et al., "Structural and Rheological Properties of Methacrylamide Modified Gelatin Hydrogels", Biomacromolecules; vol. 1, 2000, pp. 31-38.

Van Dijk-Wolthuis, et al., "Synthesis, Characterization, and Polymerization of Glycidyl Methacrylate Derivatized Dextran", Macromolecules; vol. 28, 1995, pp. 6317-6322.

Van Vlierberghe, et al., "Biopolymer-Based Hydrogels as Scaffolds for Tissue Engineering Applications: A Review", Biomacromolecules; vol. 12, 2011, pp. 1387-1408.

Wang, et al., "Self-Initiated Photopolymerization and Photografting of Acrylic Monomers", Macromol. Rapid Commun.; vol. 25, 2004, pp. 1095-1099.

Wang, et al., "Synthesis and Application of Crabohydrate-Containing Polymers", Chem. Mater.; vol. 14, 2002, pp. 3232-3244.

Technical Examination Report issued in Brazilian Application No. 122025004672-8, issued on Oct. 10, 2025, 24 pages including 12 pages of English translation.

Office Action issued in Brazilian Patent Application No. 1020190234440, issued on Apr. 11, 2025, 14 pages including pages of machine English translation.

HYDROGELS AS CARRIERS OF ACTIVE INGREDIENTS AND METHODS OF PRODUCING THE SAME

CROSS REFERENCE TO RELATED APPLICATIONS

The present application is a continuation of U.S. application Ser. No. 16/673,941, filed Nov. 4, 2019, issued as U.S. Pat. No. 11,968,976 on Apr. 30 2024, which in turn claims priority to U.S. Provisional Patent Application No. 62/758,049, filed Nov. 9, 2018, entitled "Hydrogels As Carriers of Active Ingredients and Methods of Making the Same," and is related to U.S. Non-Provisional patent application Ser. No. 16/185,406, filed Nov. 9, 2018, issued as U.S. Pat. No. 10,800,893 on Oct. 13, 2020, entitled "Lactose-Derived Hydrogels and Methods of Making the Same," and to U.S. Provisional Patent Application No. 62/758,031, filed Nov. 9, 2018, entitled "Hydrogels As Rheology Modifiers and Methods of Making the Same," all of which are hereby incorporated herein by reference in their entireties.

TECHNICAL FIELD

The present disclosure relates generally to hydrogels as carriers of active ingredients and methods of producing the same.

BACKGROUND

Commercial agriculture often utilizes pesticides such as herbicides, insecticides, fungicides, nematicides, and rodenticides to minimize or eliminate pests. Controlled release of pesticides is valuable for delivering the agents to the desired location at the desired time and at the desired rate. Prior to release, the agents must be safely and securely retained so as to avoid release in an undesired location or at an undesired time. There exists a need for safely, accurately, and economically retaining and releasing pesticides.

SUMMARY

Some implementations provide methods of delivering an active ingredient to an agricultural substrate. In embodiments, a method of delivering an active ingredient to an agricultural substrate includes preparing a carrier hydrogel and delivering the carrier hydrogel to the agricultural substrate. The carrier hydrogel is prepared by combining an active ingredient with a hydrogel precursor to produce a carrier hydrogel precursor mixture, and crosslinking the carrier hydrogel precursor mixture to produce a carrier hydrogel. The carrier hydrogel is adapted to control release of the active ingredient to the agricultural substrate, control uptake of the active ingredient by the agricultural substrate, or both control release and control uptake of the active ingredient.

In embodiments, the agricultural substrate is one or more of seed, soil, foliage, and fruit.

In embodiments, the carrier hydrogel extends an amount of time before the active ingredient is released.

In embodiments, crosslinking forms a matrix and the active ingredient is located at least partially within the matrix.

In embodiments, the active ingredient is water soluble or water insoluble.

In embodiments, the active ingredient is in liquid or solid form.

In embodiments, the active ingredient is a pesticide.

In embodiments, the active ingredient is atrazine or glufosinate ammonium.

In embodiments, the lactose is from one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

In embodiments, the lactose is from a waste product of a dairy or food processing operation. The waste product may be milk permeate.

In embodiments, a method of releasing of an active ingredient from a carrier hydrogel includes preparing a carrier hydrogel, delivering the carrier hydrogel to an agricultural site, and releasing the active ingredient from the carrier hydrogel at the agricultural site. Preparing a carrier hydrogel includes adding an active ingredient to a hydrogel precursor to produce a carrier hydrogel precursor mixture and exposing the carrier hydrogel precursor mixture to light to produce a carrier hydrogel.

In embodiments, the active ingredient is released by passive diffusion, stirring, mechanical forces, chemical degradation, biological degradation, temperature change, pH change, or digestion.

In embodiments, the carrier hydrogel is crosslinked and the crosslinking extends an amount of time before the active ingredient is released.

In embodiments, the agricultural site is one or more of seed, soil, foliage, and fruit.

In embodiments, the lactose is from one or more of purified lactose, milk permeate, whey, whey permeate, de-lactosed permeate, de-proteinized whey, dairy-derived polysaccharides, buttermilk, skim milk, mammalian milk, whole milk powder, non-fat dry milk, and butter milk powder.

In embodiments, the lactose is from a waste product of a dairy or food processing operation. The waste product may be milk permeate.

DETAILED DESCRIPTION

Figure 1:
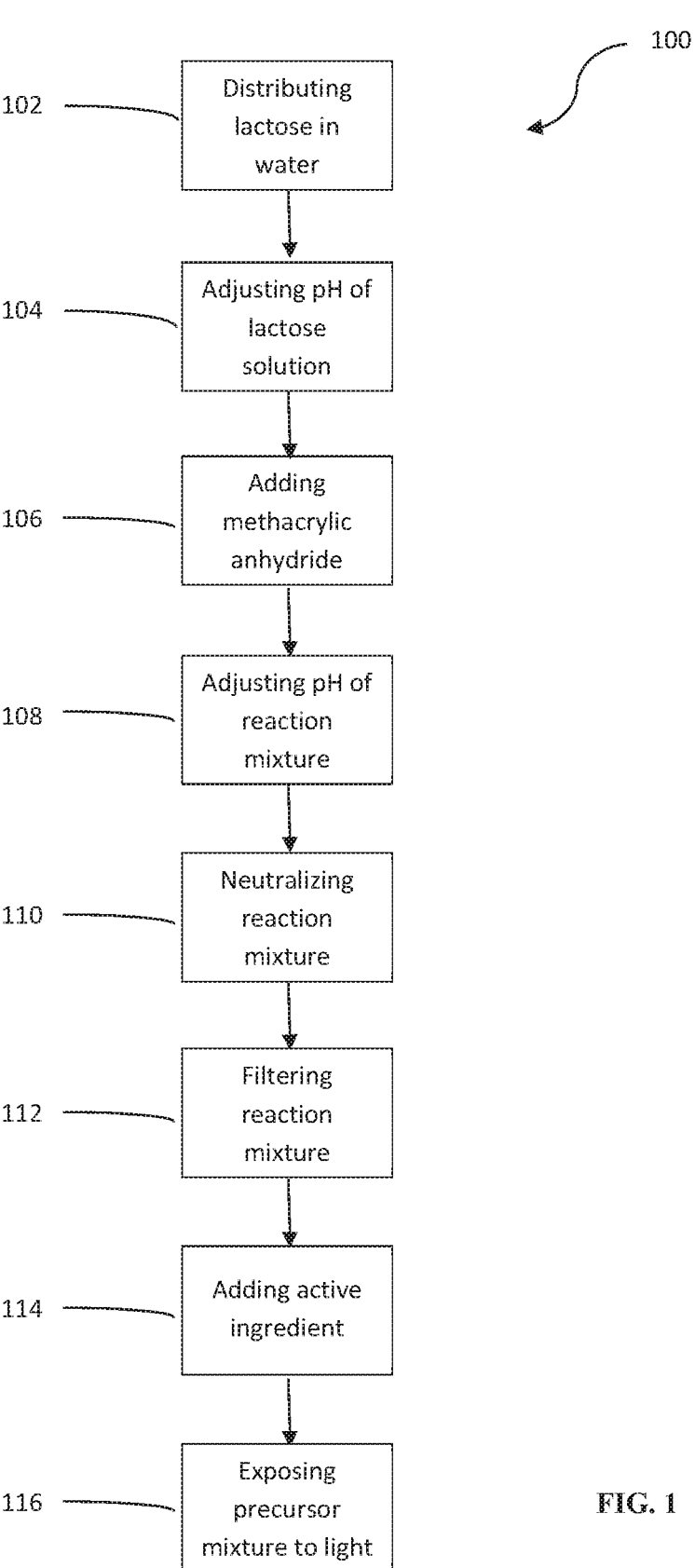
FIG. 1 is a flow diagram of a carrier hydrogel preparation method according to one embodiment.

Active ingredient-carrying hydrogels are disclosed herein. The active ingredient is retained in the hydrogel and released from the hydrogel in a controlled manner. Methods of preparing the hydrogels and methods of releasing the active ingredient from the hydrogels are also disclosed. The methods are atom economical (i.e., do not produce waste), environmentally friendly, and do not produce volatile organic compounds.

As used herein, the term "hydrogel" refers to hydrophilic polymer networks that may be swollen with water and are generally capable of absorbing water at loadings many times greater than their dry mass. The network structures may be formed with covalent bonds between polymer chains, but can also be constructed with physical crosslinks arising from, for example, chain entanglement, electrostatic interactions, and associations via strong hydrogen bonding or van der Waals interactions. The incorporation of carbohydrates into the polymer structure may introduce hydrophilicity that is helpful for the preparation of hydrogels. Sugar-containing polymers may function as hydrogels via polymer chemistries such as polyureas, phenolics, and free radical polymerization of styrenic and acrylamide derivatives.

Carrier Hydrogel Formulations

An active-ingredient carrying hydrogel (or "carrier hydrogel") may be generally understood as a composition including at least a hydrogel precursor and an active ingredient. Any hydrogel or hydrogel precursor known in the art may be suitable for use in carrier hydrogel formulations. In some embodiments, the hydrogels may be generally understood as a composition including at least one sugar and a crosslinking agent.

The sugar may be a dairy sugar. In some embodiments, the sugar is lactose. While lactose is used as an example of a suitable sugar, and lactose-derived hydrogels are described in detail throughout the present disclosure, the compositions of suitable hydrogels for use in the disclosed carrier hydrogel formulations are not limited to those that include lactose.

The lactose may include either or both of the α- and β-anomers of lactose.

The lactose may be derivatized lactose, such as esterified lactose. In one example, the esterified lactose is lactose methacrylate. Lactose may be derivatized at any one or more of the eight free hydroxyl groups. Lactose methacrylate may include lactose mono-methacrylate, lactose di-methacrylate, lactose tri-methacrylate, higher lactose methacrylates, or any combination thereof. The methacrylate monomers may be present in any proportion.

The lactose may be an isolated and/or relatively pure lactose. For example, the lactose may be a commercially available lactose monohydrate having ≥94% α-lactose. The lactose, or other dairy sugar, may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

In the implementations and use of a carrier hydrogel, sourcing lactose and/or other dairy sugars from an existing waste stream may help utilize an untapped feedstock, reduce the cost of producing the carrier hydrogel, and/or reduce the cost of producing the material that generated the lactose-containing waste stream.

In some examples, the lactose is dissolved in water prior to combining the lactose with the acrylic acid derivative.

The crosslinking agent may be an acrylic acid derivative. The acrylic acid derivative may be methacrylic anhydride, methacrylic monomers, methacryloyl chloride, activated acrylates, acrylic anhydride, acrylic acid, or any combination thereof. In one example, the acrylic acid derivative is methacrylic anhydride.

In some embodiments, the lactose and methacrylic anhydride may be combined to form a hydrogel precursor mixture. In some examples, lactose and methacrylic anhydride are combined in the presence of sodium hydroxide to produce a hydrogel precursor mixture including lactose methacrylate, sodium methacrylate, and/or methacrylic acid.

The ratio of lactose to methacrylic anhydride in the precursor mixture may be from about 1.0:0.1 to about 1.0:3.0, such as about 1.0:0.1, about 1.0:0.5, about 1.0:1.0, about 1.0:2.0, or about 1.0:3.0.

In the implementations and use of a carrier hydrogel, varying the ratio of lactose to methacrylic anhydride in the precursor mixture may help tune various hydrogel properties, such as rheological characteristics, structure, gel strength, and/or visual clarity.

The active ingredient may be solid or liquid. The active ingredient may be water soluble or water insoluble. The active ingredient may be a pesticide such as an herbicide, insecticide, fungicide, nematicide, or rodenticide. In one example, the active ingredient is atrazine (1-Chloro-3-ethylamino-5-isopropylamino-2,4,6-triazine), a solid, water-insoluble herbicide. In one example, the active ingredient is glufosinate ((RS)-2-amino-4-(hydroxy(methyl)phosphonoyl)butanoic acid), a water-soluble herbicide.

Other examples of compatible herbicides include glyphosate (e.g., N-(phosphonomethyl)glycine) in various forms including in the form of a salt, ester, or other derivative thereof. Examples of glyphosate products include, but are not limited to, glyphosate as a potassium salt (e.g., Roundup PowerMax® and Touchdown Total®); as a dimethylamine salt (e.g., Durango® DMA®); as an isopropylamine salt (e.g., Cornerstone® 5 plus); and glyphosate in combination with other pesticides such as 2,4-Dichlorophenoxyacetic acid (2,4-D) (e.g., Enlist Duo™) and with dicamba (e.g., Mon 76832 and Roundup® Xtend).

Further examples of compatible herbicides include, but are not limited to, the sodium salt of bentazon (3-(1-methylethyl)-1H-2, 1,3-benzothiadiazin-4 (3H)-one 2,2-dioxide) (e.g., Basagran®); diglycolamine salt of 3,6-dichloro-o-anisic acid (e.g., Sterling® Blue); 3,6-dichloro-2-methoxybenzoic acid (e.g., Dicamba, Enginia™); 2,4-dichlorophenoxyacetic acid (2,4-D); amide herbicides; arsenical herbicides; carbamate and tiocarbamate herbicides; carboxylic acid herbicides; dinitronailine herbicides; heterocyclic nitrogen-containing herbicides; organophosphate compounds; urea herbicides; quaternary herbicides; 5-[2-chloro-4-(trifluoromethyl)phenoxy]-N-(methylsulfonyl)-2-nitrobenzamide (Fomesafen); and tembotrione (e.g., Laudis®).

Compatible insecticides include, but are not limited to, pyrethroid insecticides (e.g., bifenthrin); pyrethrins or other botanicals (e.g., D-limonene, linalool, ryania, rotenone, eugenol (clove oil)); chloronicotinyls; essential oils (e.g., lemongrass, pepper wintergreen, rosemary, cinnamon, sesame, thyme, cedar oils, and capsaicin); neem oil (e.g., Azadirachtin); nicotine; microbial products (e.g., *Bacillus thuringeinis* and *Beauveria bassiana*); oxadiazines (e.g., Indoxacarb); anthranilic diamide (e.g., chlorantraniliprole); juvenile hormone mimics (e.g., fenoxycarb, pyriproxifen, methoprene, and hydroprene); pyrroles (e.g., chlorfenapyr); phenylpyrazoles (e.g., fipronil); organophosphates (e.g., malathion and chlorpyrifos); inorganics (e.g., sulfur and dormant and horticultural oils); insect growth regulators such as chitin synthesis inhibitors (e.g., hexaflumuron; noviflumuron; diflubenzuron; buprofezine; cyromazine; and halofenozide); acaricides such as miticides (e.g., avermectin); and ixodicides.

Compatible fungicides include, but are not limited to, fluxapyroxad, pyraclostrobin, propiconazole, trifloxystrobin, prothioconazole, 1,2-propanediol, azoxystrobin (e.g., Priaxor®, Onset®, Topaz®, Headline® amp, Headline® SC, Stratego®, and Quadris®) alone or in any combination.

Other compatible active ingredients may include adjuvants, micronutrients, macronutrients, plant growth regulators, and animal repellents.

In some implementations, the disclosed carrier hydrogels utilize a lactose source that has been known as a waste byproduct or waste stream from a separate manufacturing process. The carrier hydrogels may be biodegradable. The carrier hydrogels, and the methods of making them, may be more environmentally friendly than known hydrogels and production methods. The methods are described in more detail immediately below.

Figure 2:
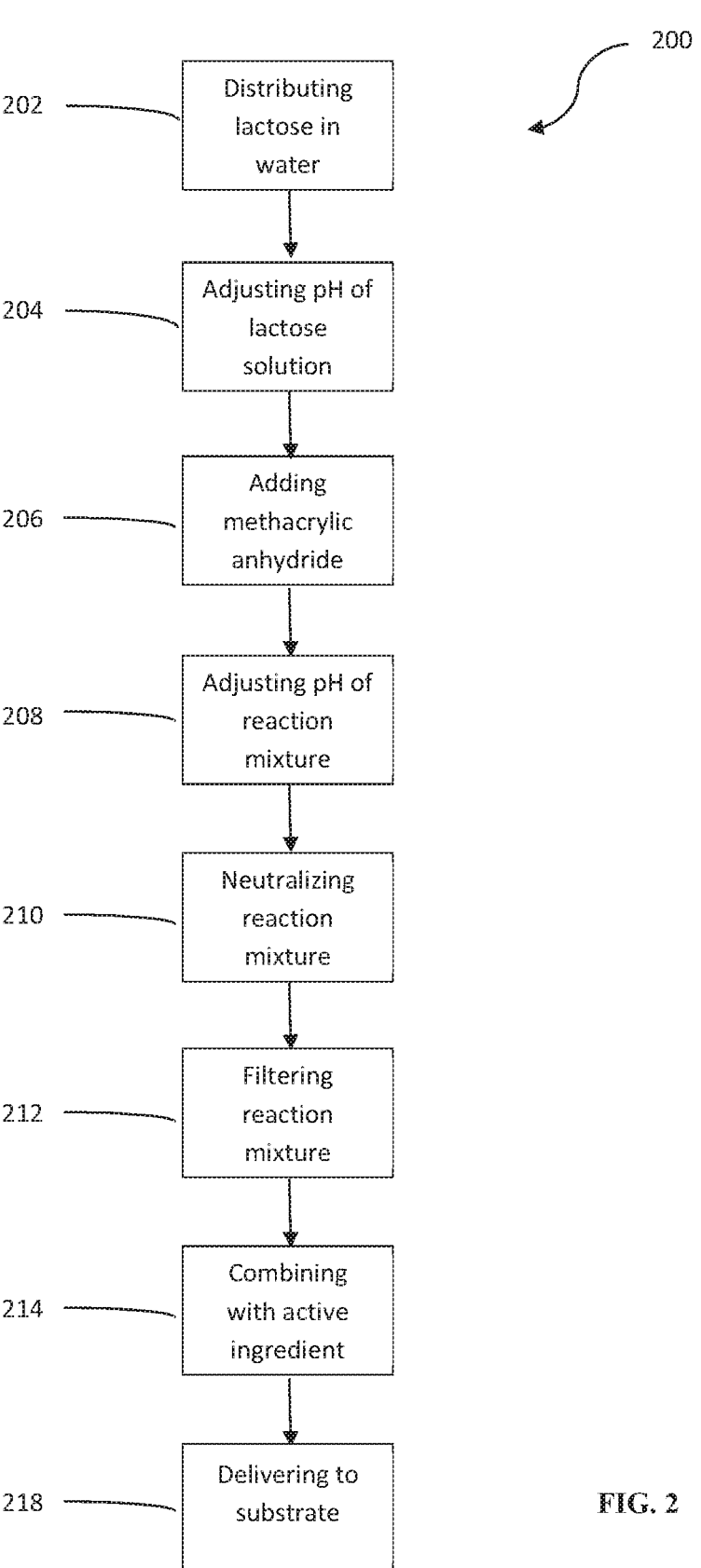
FIG. 2 is a flow diagram of a carrier hydrogel precursor mixture preparation method according to one embodiment.
Figure 3:
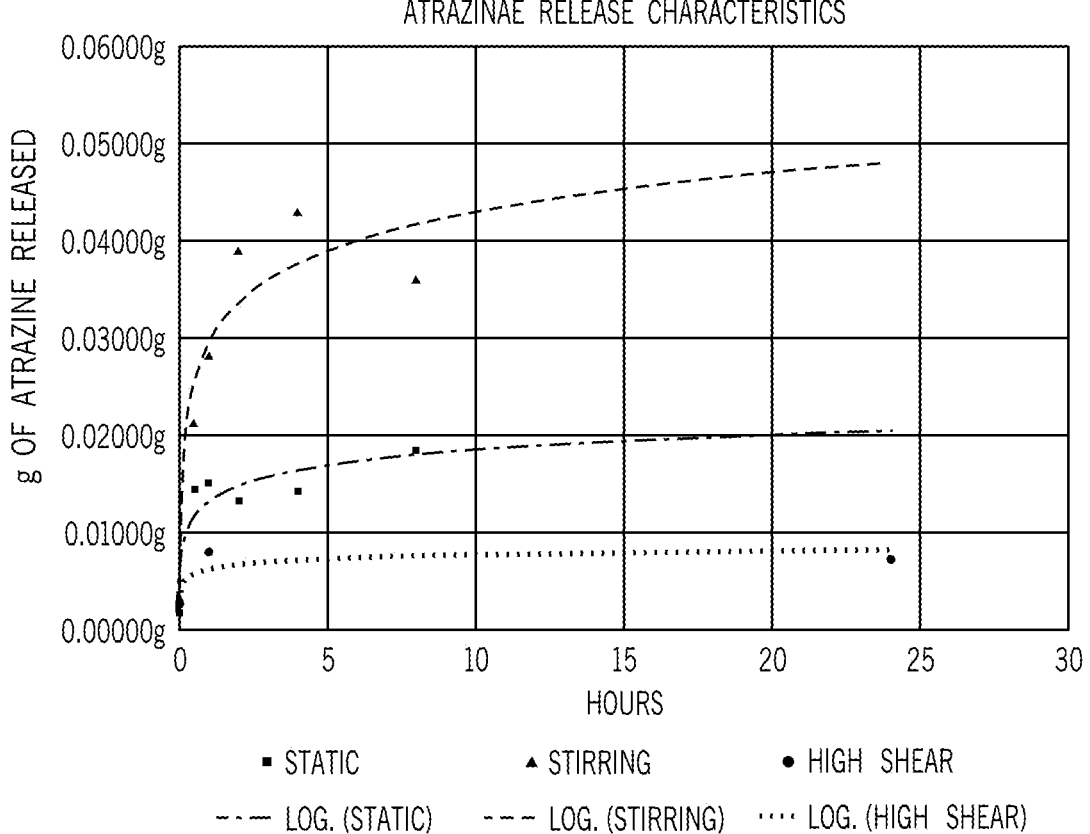
FIG. 3 is a graph of atrazine release from a carrier hydrogel, prepared according to the method of FIG. 1, as a function of time.

As described in more detail in Example 2, and as shown in FIGS. 2 and 3, the carrier hydrogels may release the active ingredient over time as the carrier hydrogel breaks down. In some implementations, agitation of the hydrogel may help speed up the rate of release of the active ingredient.

Methods of Producing Carrier Hydrogels

In general, methods of producing the disclosed carrier hydrogels include combining an active ingredient with a hydrogel precursor to produce a carrier hydrogel precursor mixture, and crosslinking the carrier hydrogel precursor mixture to produce a carrier hydrogel. Crosslinking may form a matrix and the active ingredient may be located at least partially within the matrix.

In some examples, methods of producing the disclosed carrier hydrogels include copolymerizing lactose methacrylate, methacrylic acid, and sodium methacrylate in a one-pot reaction using light-induced photopolymerization in the absence of a photoinitiator. No volatile organic compounds or waste products are generated by the methods. The ratios of lactose to methacrylic anhydride may be varied to produce hydrogels with different properties.

FIG. 1 illustrates a method 100 of preparing a carrier hydrogel. The method 100 includes a step 102 of distributing lactose in water to produce a lactose solution, a step 104 of adjusting the pH of the lactose solution, a step 106 of adding methacrylic anhydride to the lactose solution to produce a reaction mixture, a step 108 of adjusting the pH of the reaction mixture, an optional step 110 of neutralizing the reaction mixture, a step 112 of filtering the reaction mixture to produce a hydrogel precursor mixture, a step 114 of adding an active ingredient to the hydrogel precursor mixture to produce a carrier hydrogel precursor mixture, and a step 116 of exposing the carrier hydrogel precursor mixture to light to produce a carrier hydrogel.

In step 102, the lactose and water may be stirred, which may help distribute the lactose. Additionally or alternatively, the lactose and water may be heated, such as from about 25° C. to about 90° C., or about 65° C. to about 90° C., which may help distribute the lactose. The lactose and water may be stirred and/or heated until the lactose is partially or completely dissolved in the water to produce a lactose solution.

The lactose may be an isolated and/or relatively pure lactose. For example, the lactose may be a commercially available lactose monohydrate having ≥94% α-lactose. The lactose may be provided in milk permeate, whey, whey permeate, de-lactosed permeate, de-proteinized whey, dairy-derived polysaccharides, buttermilk, skim milk, mammalian milk, whole milk powder, non-fat dry milk, butter milk powder, or any combination thereof. The lactose may be provided in a waste stream from, for example, a dairy or food processing operation. In one example, the lactose is provided in waste milk permeate from a dairy operation.

The lactose solution produced in step 102 may be cooled, such as passively to room temperature, prior to step 104.

In step 104, the pH of the lactose solution is adjusted to a pH of at most about 10. In one example, aqueous sodium hydroxide is added to the solution to increase the pH. In one example, the lactose in step 102 is provided by milk permeate and the lactose solution has an unadjusted pH of about 6.2 to about 6.4.

In step 106, the lactose solution and methacrylic anhydride may be stirred together. Methacrylic anhydride may be added in an amount that yields a desired ratio of lactose to methacrylic anhydride. Examples of molar ratios of lactose to methacrylic anhydride include about 1.0:0.5, about 1.0:1.0, and about 1.0:2.0. The lactose and methacrylic anhydride may react to produce lactose methacrylate.

In step 108, the pH of the reaction mixture is adjusted to a pH of at most about 10. In some implementations, the pH is not permitted to exceed about 10. In one example, a pH of about 9.5±0.5 is maintained with the slow addition of aqueous sodium hydroxide.

In one example, the lactose is functionalized with methacrylate groups by esterification with methacrylic anhydride to produce lactose methacrylate. The lactose methacrylate may include lactose mono-methacrylate, lactose di-methacrylate, lactose tri-methacrylate, and/or higher lactose methacrylate monomers. In the example, sodium methacrylate is generated as a by-product of the esterification and as a result of hydrolysis. Methacrylic acid is also generated in the esterification reaction. The lactose methacrylate, sodium methacrylate, and/or methacrylic acid may copolymerize.

In some implementations, the reaction mixture is allowed to stir, such as for about 30 minutes at room temperature, after the addition of sodium hydroxide and before step 110.

In step 110, the reaction mixture may be neutralized to a pH of about 7. In one implementation, the reaction mixture is neutralized by the addition of hydrochloric acid. In some implementations, step 110 is not performed.

In step 112, the reaction mixture may be filtered by, for example, gravity filtration, vacuum filtration, or centrifugation, which may help to remove insoluble particles. In one implementation, the reaction mixture is gravity filtered through qualitative filter paper. The filtrate is used in step 114 as a hydrogel precursor mixture.

In step 114, the active ingredient may be in solid or liquid form. The active ingredient may be water soluble or water insoluble. In some examples, the active ingredient is water insoluble but is dissolved in an organic solvent, with or without a surfactant. The active ingredient may later, such as in step 116, be entrapped in the hydrogel matrix.

In step 116, the carrier hydrogel precursor mixture is exposed to light, which may help to induce self-initiated copolymerization of lactose methacrylate, methacrylic acid, and sodium methacrylate. Lactose di- and higher methacrylates may serve as crosslinkers during polymerization. In one example, the light is in the ultraviolet spectrum. In one example, the UV light has a wavelength of about 365 nm and/or an intensity of about 3.4 mW/cm$^2$ to about 3.8 mW/cm$^2$. In one example, the carrier hydrogel precursor mixture is exposed to UV light for about 60 minutes at room temperature.

In some implementations, the carrier hydrogel precursor mixture is not crosslinked before being delivered to a substrate. In some implementations, the carrier hydrogel precursor mixture is crosslinked after being delivered to a substrate. The carrier hydrogel precursor mixture may cross-link to form a hydrogel via exposure to ambient light.

FIG. 2 illustrates a method 200 of preparing and applying a carrier hydrogel precursor mixture. In the method 200, the carrier hydrogel precursor mixture is not crosslinked before being delivered to a substrate. The method 200 includes a step 202 of distributing lactose in water to produce a lactose solution, a step 204 of adjusting the pH of the lactose solution, a step 206 of adding methacrylic anhydride to the lactose solution to produce a reaction mixture, a step 208 of adjusting the pH of the reaction mixture, an optional step 210 of neutralizing the reaction mixture, an optional step 212 of filtering the reaction mixture to produce a hydrogel precursor mixture, a step 214 of combining the hydrogel precursor mixture with an active ingredient to produce a carrier hydrogel precursor mixture, and a step 218 of delivering the carrier hydrogel precursor mixture to a substrate.

Steps 202, 204, 206, 208 are as described above for steps 102, 104, 106, and 108, respectively. Optional step 210 is as described above for optional step 110. Optional step 212 is as described above for step 112.

Step 214 is as described above for step 114. Additionally or alternatively, the active ingredient may be diluted before being combined with the hydrogel precursor mixture, and/or the carrier hydrogel precursor mixture may be diluted. In one example, each of the active ingredient and the hydrogel precursor mixture is diluted by combining each with water, such as by adding each to a tank of water.

In step 218, the carrier hydrogel precursor mixture may be delivered via drip irrigation, pivot irrigation, broadcast spraying, banded application, spot application, gandy boxes, pull-behind equipment, self-propelled equipment, planes, helicopters, drones, in-furrow applications, and/or side-dress applications. The substrate to which the carrier hydrogel precursor mixture is delivered may be, for example, an agricultural substrate such as seed, soil, foliage, or fruit.

The carrier hydrogel precursor mixture may crosslink to form a hydrogel after being delivered to the substrate, such as via exposure to ambient light.

In some implementations, crosslinking of the carrier hydrogel extends the amount of time before the active ingredient is released. The amount of time may be longer than a carrier that is not crosslinked.

Methods disclosed herein of producing carrier hydrogels may have numerous benefits, including benefits over known methods of producing carriers of active ingredients. The disclosed methods may employ green chemistry techniques and/or be more environmentally friendly than known production methods. The disclosed methods may utilize a lactose source that has been known as a waste byproduct or waste stream from a separate manufacturing process, such as from the dairy or food processing industry. The disclosed methods may be more cost-effective than known methods.

The disclosed methods are suitable for solid, liquid, water soluble, or water insoluble active ingredients.

The disclosed methods are readily adjustable, such as by tuning the molar ratios of the lactose and methacrylic anhydride starting materials, to produce hydrogels with desired features, such as structure, gel strength, visual clarity, and rheological properties.

Photopolymerization of lactose methacrylate, methacrylic acid, and sodium methacrylate monomers may proceed in the absence of a photoinitiator, which permits exclusion of a photoinitiator from the methods. The disclosed methods may achieve high polymerization rates, even in the absence of a photoinitiator.

Other benefits may include, but are not limited to, performing the method in water, performing the method at ambient temperature, producing no waste (i.e., the method is atom economic), and/or producing no volatile organic compound by the method.

Methods of Releasing Active Ingredients from Carrier Hydrogels

An active ingredient may be retained in a carrier hydrogel for a desired amount of time. An active ingredient may be released from a carrier hydrogel in a controlled manner, such as at a desired location, at a desired time, and/or at a desired rate. The active ingredient may be released from a hydrogel by, for example, passive diffusion, stirring, mechanical forces such as chewing or shearing, chemical degradation, biological degradation, temperature change, pH change, or digestion. In some implementations, the carrier hydrogel is adapted to control uptake of the active ingredient by a substrate to which the carrier hydrogel is applied.

In some implementations, a carrier hydrogel is dried and later rehydrated before delivery to a desired location. In one example, a dried hydrogel is added to a vessel and a liquid is also added to the vessel. The dried hydrogel may be in powder form. The vessel may be a spray tank. The liquid may rehydrate the dried hydrogel before or as the hydrogel is applied to a desired location.

In some implementations, a carrier hydrogel is not dried. In one example, an undried hydrogel is added to a vessel and a liquid is also added to the vessel. The undried hydrogel may be in liquid, gel, semi-solid, or solid form. The vessel may be a spray tank. The hydrogel may absorb none, some, or all of the liquid before or as the hydrogel is applied to a desired location.

In some implementations, the carrier hydrogel is used in the agricultural industry, such as to carry a pesticide. In some examples, the target delivery location of the pesticide is a substrate, for example an agricultural substrate such as seed, soil, foliage, or fruit. The target delivery location may be above plants or soil or may be subsurface. In some example, the carrier hydrogel or carrier hydrogel precursor mixture is delivered via drip irrigation, pivot irrigation, broadcast spraying, banded application, spot application, gandy boxes, pull-behind equipment, self-propelled equipment, planes, helicopters, drones, planting the hydrogel, in-furrow applications, and/or side-dress applications.

EXAMPLES

The following examples illustrate various aspects of the disclosure and should not be considered limiting.

Example 1—Preparation of Herbicide-Carrying Lactose-Derived Hydrogels

Herbicide-carrying lactose-derived hydrogels were prepared in general accordance with the methods described in U.S. Non-Provisional patent application Ser. No. 16/185, 406, filed Nov. 9, 2018, entitled "Lactose-Derived Hydrogels and Methods of Making the Same," the contents of which are hereby incorporated by reference in their entirety. Briefly, a hydrogel having a 2:1 lactose:methacrylic anhydride (mol:mol) ratio and carrying an herbicide was prepared as follows.

To a 100 mL round-bottom flask equipped with a magnetic stirbar was added permeate powder (50 g) and deionized water (100 mL). The mixture was stirred at 65° C. until a clear, colorless solution was produced (about 15 minutes). The solution was then allowed to cool to room temperature and aqueous sodium hydroxide (2.5 M, about 3 drops) was added until the solution had a pH of about 10. Methacrylic anhydride (10.7 g; 94%, with 2000 ppm tropanol A as inhibitor, MilliporeSigma, St. Louis, MO) was added and the mixture was stirred vigorously. A pH of 9.5±0.5 was maintained with the slow addition of sodium hydroxide (28.5 g; 2.5 M); the pH was not allowed to exceed 10. After the addition of sodium hydroxide was complete, the reaction mixture was allowed to stir at room temperature for 30 minutes.

Hydrochloric acid (0.5 g; 1 N; ACS Plus, Thermo Fisher Scientific, Hampton, NH) was added to neutralize the reaction mixture to pH 7. The mixture was then centrifuged and decanted to yield a hydrogel precursor mixture, which was transferred to a polystyrene petri dish.

Either atrazine or glufosinate ammonium was added to a hydrogel precursor mixture to produce a carrier hydrogel precursor mixture. Atrazine (2.5 g; 42% suspension concentrate) was added to 9 g of hydrogel precursor mixture. Glufosinate (1.5 g; 97.1% technical grade) was added to 9 g of hydrogel precursor mixture.

The carrier hydrogel precursor mixture was then UV irradiated (365 nm, 3.4-3.8 mW/cm$^2$) for 60 minutes at room temperature. Photo-induced copolymerization of lactose methacrylate, methacrylic acid, and sodium methacrylate in the precursor mixture yielded a hydrogel carrying either atrazine or glufosinate ammonium.

Example 2—Analysis of Herbicide Release from Carrier Hydrogels

Hydrogels loaded with either atrazine or glufosinate ammonium were prepared according to the method of Example 1. Ingredient release via passive diffusion from, stirring of, or shearing of the carrier hydrogels was tested according to the following procedure.

Punches (1.5 cm diameter) were taken in duplicate or triplicate from each hydrogel disk. Each punch was dipped quickly in deionized water and then introduced to a 250 mL jar containing 100 mL of deionized water. The jar of water and hydrogel punch was briefly swirled and then a 1 mL baseline sample of the solute was withdrawn and collected in a vial.

For each of the atrazine and glufosinate ammonium hydrogels, one jar was held static, one jar was agitated continuously on a shaker table at 50% speed, and the contents of one jar were high sheared at 5000 rpm for one minute using a high shear mixer. Solute samples from the static and shaken jars were taken after 30 minutes, 1 hour, 2 hours, 4 hours, 8 hours, and 24 hours. Prior to collecting samples from the static jar, the jar was swirled to homogenize the solute. Solute samples from the high shear jar were taken after 5 minutes, 1 hour, and 24 hours.

Release of the herbicide was determined by HPLC. Each 1 mL solute sample from the atrazine jars was brought to 5 mL with acidified (0.1% H$_3$PO$_4$) acetonitrile. The samples were then analyzed using the following HPLC conditions: Kinetex® 5 μm C18 100 Å LC Column 250×4.6 mm (Phenomenex®, Torrance, CA); column compartment held at 30° C.; 10 μL injection; mobile phase A-deionized water with 0.1% H$_3$PO$_4$; mobile phase B-acetonitrile with 0.1% H$_3$PO$_4$; pump rate of 1 mL/min; isocratic run at 15% A and 85% B; 8-min run; detector set at 254 nm; and retention time=2.92 min.

Each 1 mL solute sample from the glufosinate ammonium jars was brought to 5 mL with 0.05 mM KH$_2$PO$_4$ buffer with 5% MeOH. The samples were then analyzed using the following HPLC conditions: Partisil 10 SAX LC Column 250×4.6 mm (Hichrom Ltd., Berkshire, UK); column compartment held at 30° C.; 25 μL injection; mobile phase-25 mMol KH$_2$PO$_4$; pump rate of 2 mL/min; 5-min run; detector set at 195 nm; and retention time=2.13 min.

For each of atrazine and glufosinate ammonium, the solute samples were compared against external samples for quantification.

Figure 4:
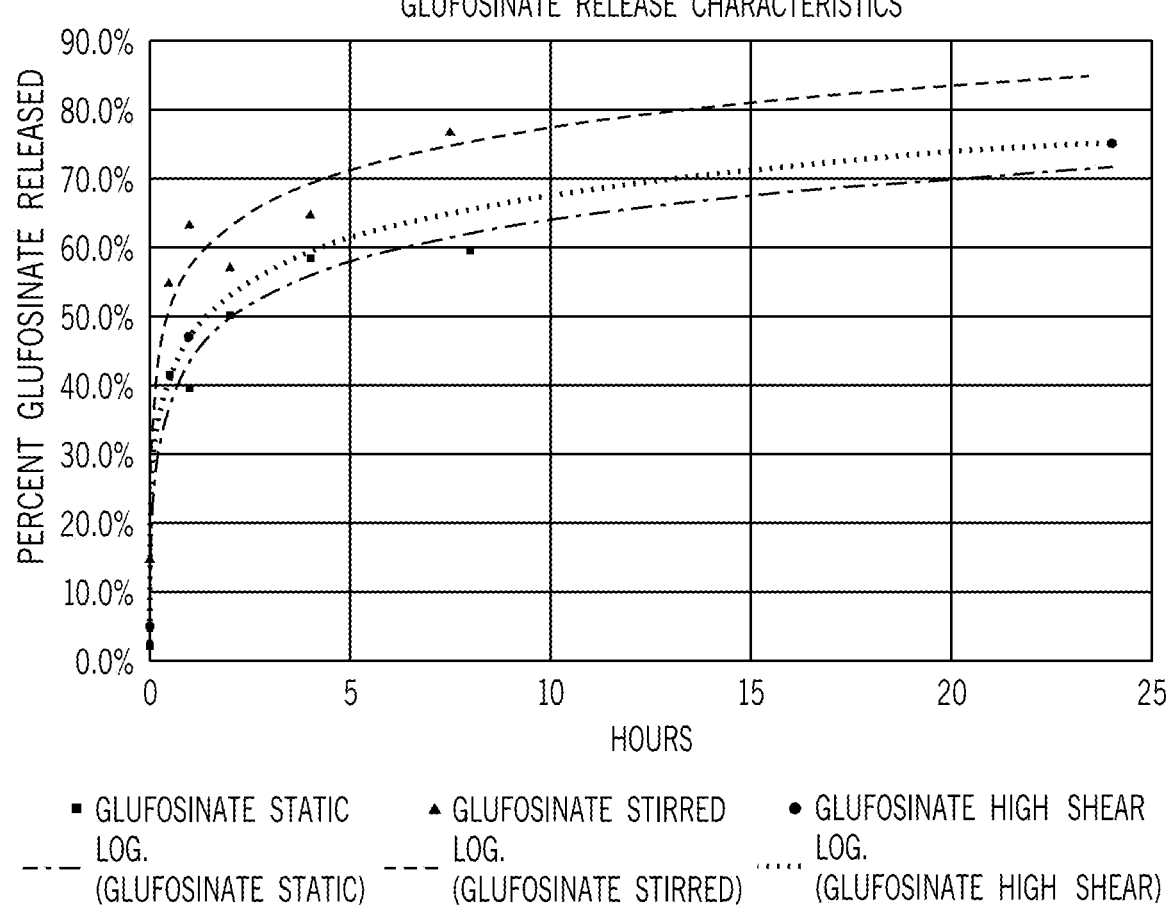
FIG. 4 is a graph of glufosinate release from a carrier hydrogel, prepared according to the method of FIG. 1, as a function of time.

Results are presented in FIG. 3 (atrazine) and FIG. 4 (glufosinate ammonium). The results demonstrate that hydrogels loaded with atrazine slowly break down and release the atrazine. Release is hastened by agitating the hydrogel. With mild agitation, the loaded hydrogels largely fell apart and released most of the atrazine in less than an hour. Without being limited to any mechanism or mode of action, agitation (e.g., swirling a jar prior to collecting a sample) may help break up a hydrogel and/or help release an active ingredient to a greater extent than the action of high shear in the absence of agitation.

The results demonstrate that hydrogels loaded with glufosinate slowly break down and release the glufosinate. Release is hastened by agitating the hydrogel. With mild agitation, the loaded hydrogels largely fell apart and released most of the glufosinate within a few hours.

Example 3—Herbicide-Induced Injury from Carrier Hydrogel Precursor Mixtures Applied to Plants Release of an herbicide from loaded hydrogels was indirectly studied by examining plant injury or death. Hydrogel precursor mixtures were prepared according to the method 200 illustrated in FIG. 2. The precursor mixture was prepared at a lactose to methacrylic anhydride ratio of 1:0.5.

Glyphosate (as Touchdown HiTech®, Syngenta) alone (control group) or glyphosate plus hydrogel precursor mixture (test groups) was added to water to form a spray solution. The amount of glyphosate in a spray solution was approximately the same (i.e., about 2.34% v/v) for each control and test group. Test groups also included hydrogel precursor mixture at 5% v/v, 10% v/v, 20% v/v, 25% v/v, or 50% v/v of spray solution. Each group included five gumbo plants in a greenhouse. Control or test groups were sprayed at 10 gallons of spray solution per acre. In the test groups, the hydrogel precursor mixtures plus glyphosate were allowed to crosslink in ambient conditions after application to the plants.

Figure 5:
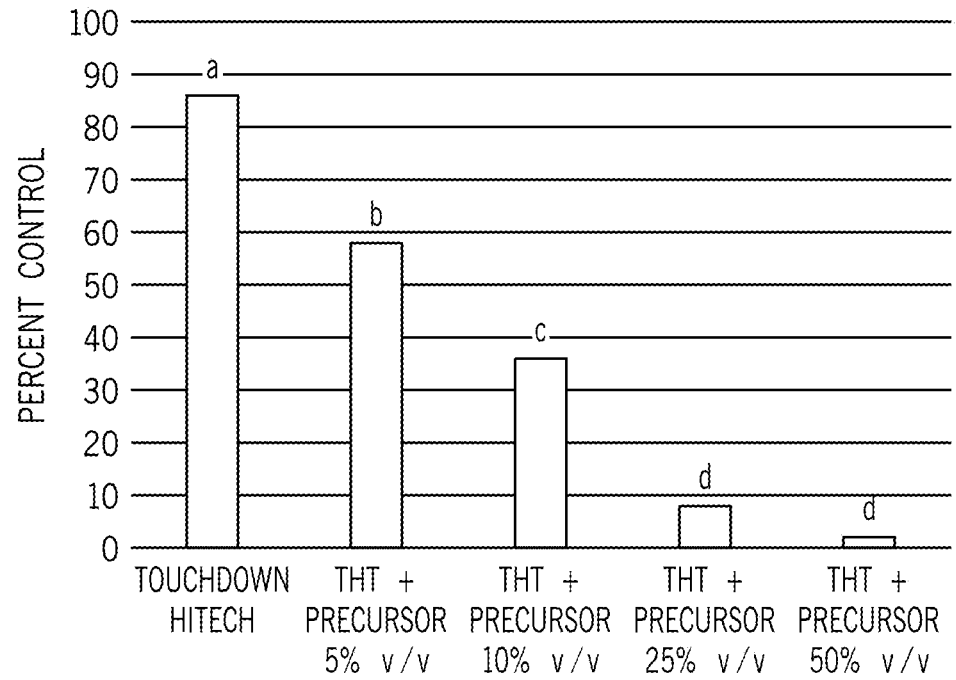
FIG. 5 is a graph of glyphosate-induced plant injury or death 14 days after application of a carrier hydrogel precursor mixture, prepared according to the method of FIG. 2.
Figure 6:
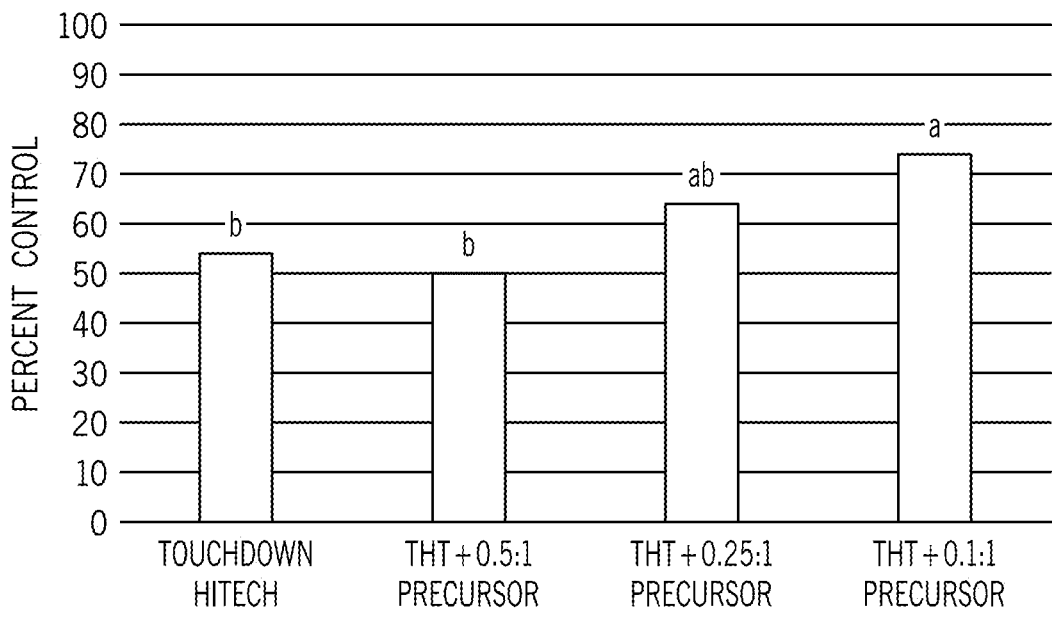
FIG. 6 is a graph of glyphosate-induced plant injury or death 14 days after application of a carrier hydrogel precursor mixture, prepared according to the method of FIG. 2.

Plant injury or death, from direct glyphosate application (control) or release of glyphosate from carrier hydrogels (tests), was measured after 14 days by a visual rating system. Results are presented in FIG. 5 as plant injury or death as a percentage, where "100% control" represents total death of a plant. The same letter attributed to more than one group indicates no statistically significant difference between those groups. Different letters attributed to more than one group indicate a statistically significant different (95% CI) between those groups.

Glyphosate alone resulted in an average of 85% damage on plants after 14 days. Combining glyphosate with a hydrogel precursor at any amount (v/v) of precursor decreased the amount of plant injury compared to control. Higher amounts of hydrogel precursor mixture led to less plant injury than did lower amounts of hydrogel precursor mixture.

The results demonstrate that a hydrogel will form when a dilute aqueous solution of an active ingredient, such as glyphosate, and a hydrogel precursor mixture is applied to plants and allowed to crosslink. The results also demonstrate that the active ingredient may be retained by the hydrogel as it forms over time. Without being limited to any mechanism or mode of action, higher amounts of hydrogel precursor mixture in a spray solution may lead to more retention of the active ingredient in spray droplets.

Example 4—Herbicide-Induced Injury from Carrier Hydrogel Precursor Mixtures Applied to Plants Release of an herbicide from loaded hydrogels was indirectly studied by examining plant injury or death. Hydrogel precursor mixtures were prepared according to the method 200 illustrated in FIG. 2. The precursor mixture was prepared at a lactose to methacrylic anhydride ratio of 1:0.5, 1:0.25, or 1:0.1 (test groups).

Glyphosate (as Touchdown HiTech®, Syngenta) alone (control group) or glyphosate plus hydrogel precursor mixture (test groups) was added to water to form a spray solution. The amount of glyphosate in spray solution was approximately the same (i.e., about 2.34% v/v) for each control and test group. Test groups also included one of the hydrogel precursor mixtures at 5% v/v. Each group included five gumbo plants in a greenhouse. Control or test groups were sprayed at 10 gallons of spray solution per acre. In the test groups, the hydrogel precursor mixtures plus glyphosate were allowed to crosslink in ambient conditions after application to the plants.

Plant injury or death, from direct glyphosate application (control) or release of glyphosate from carrier hydrogels (tests), was measured after 14 days by a visual rating system. Results are presented in FIG. 5 as plant injury or death as a percentage, where "100% control" represents total death of a plant. The same letter attributed to more than one group indicates no statistically significant difference between those groups. Different letters attributed to more than one group indicate a statistically significant different (95% CI) between those groups.

Glyphosate alone resulted in an average of 55% damage on plants after 14 days. Plant injury increased as the lactose to methacrylic anhydride ratio in hydrogel precursor mixtures decreased. Precursor mixtures with lactose to methacrylic anhydride ratios of 1:0.1 caused statistically significantly more plant injury than glyphosate alone. Hydrogels formed from precursor mixtures having a lower lactose to methacrylic anhydride ratio (e.g., 1:0.1) may cause more injury to plants when applied with an active ingredient than hydrogels formed from precursor mixtures having a higher amount lactose to methacrylic anhydride ratio (e.g., 1:0.25 or 1:0.5). Without being limited to any mechanism or mode of action, hydrogels formed from lower lactose to methacrylic anhydride ratios may release more of an active ingredient and/or may release the active ingredient over a longer period of time than hydrogels formed from higher lactose to methacrylic anhydride ratios.

Although the present disclosure provides references to preferred embodiments, persons skilled in the art will recognize that changes may be made in form and detail without departing from the spirit and scope of the invention.

What is claimed is:

1. A method of delivering an active ingredient to an agricultural substrate, the method comprising:
   delivering a carrier hydrogel precursor mixture from a spray tank to the agricultural substrate at an agricultural site, the carrier hydrogel precursor mixture comprising an active ingredient combined with a hydrogel precursor, wherein prior to delivery, the carrier hydrogel precursor mixture is not cross-linked; and
   at the agricultural site, allowing ambient light induced cross-linking, in the absence of a photoinitiator, of the carrier hydrogel precursor mixture to produce a carrier hydrogel.

2. The method of claim 1, wherein the agricultural substrate is one or more of seed, soil, foliage, and fruit.

3. The method of claim 1, wherein at the agricultural site, the cross-linked carrier hydrogel breaks down and thereby extends an amount of time before the active ingredient is released.

4. The method of claim 1, wherein the cross-linking forms a matrix and the active ingredient is located at least partially within the matrix.

5. The method of claim 1, wherein the active ingredient is water soluble or water insoluble.

6. The method of claim 1, wherein the active ingredient is in liquid or solid form.

7. The method of claim 1, wherein the active ingredient is a pesticide.

8. The method of claim 1, wherein the active ingredient is atrazine or glufosinate ammonium.

9. The method of claim 1, wherein the active ingredient is one or more of an adjuvant, a micronutrient, a macronutrient, a plant growth regulator, or an animal repellant.

10. The method of claim 1, further comprising forming the carrier hydrogel precursor mixture by admixing the active ingredient with the hydrogel precursor.

11. The method of claim 10, wherein forming the carrier hydrogel precursor mixture further comprises neutralizing at least the hydrogel precursor.

12. The method of claim 1, wherein prior to delivery, the carrier hydrogel precursor mixture is at a neutral pH.

13. A method of delivering an active ingredient from a spray tank, the method comprising:
   delivering a dilute carrier hydrogel precursor mixture to an agricultural site from the spray tank, the dilute carrier hydrogel precursor mixture being free of a photoinitiator and comprising an active ingredient, a hydrogel precursor, and water, wherein prior to delivery, the carrier hydrogel precursor mixture is not cross-linked, and
   wherein at the agricultural site, the dilute carrier hydrogel precursor mixture is exposed to ambient light to produce a cross-linked carrier hydrogel.

14. The method of claim 13, wherein the dilute carrier hydrogel precursor mixture is delivered by spraying, and wherein upon spraying, the cross-linked carrier hydrogel is produced.

15. The method of claim 13, wherein at the agricultural site, the cross-linked carrier hydrogel breaks down and thereby extends an amount of time before the active ingredient is released.

16. The method of claim 13, wherein the agricultural site is one or more of seed, soil, foliage, and fruit.

17. The method of claim 13, wherein the active ingredient is one or more of an adjuvant, a micronutrient, a macronutrient, a plant growth regulator, or an animal repellant.

18. The method of claim 13, wherein the active ingredient is water soluble or water insoluble.

19. The method of claim 13, wherein the active ingredient is in liquid or solid form.

20. The method of claim 13, wherein the active ingredient is a pesticide.

* * * * *